(12) United States Patent
Aoto

(10) Patent No.: US 8,556,007 B2
(45) Date of Patent: *Oct. 15, 2013

(54) FUEL CELL MODULE FOR VEHICLES

(75) Inventor: Akira Aoto, Okazaki (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,946

(22) Filed: Sep. 14, 2012

(65) Prior Publication Data

US 2013/0011761 A1    Jan. 10, 2013

Related U.S. Application Data

(62) Division of application No. 13/425,075, filed on Mar. 20, 2012, now Pat. No. 8,302,712, which is a division of application No. 12/523,009, filed as application No. PCT/JP2008/050654 on Jan. 11, 2008, now abandoned.

(30) Foreign Application Priority Data

Jan. 16, 2007    (JP) ................................ 2007-006859

(51) Int. Cl.
  *B60K 1/00*    (2006.01)
  *H01M 8/24*    (2006.01)
(52) U.S. Cl.
  USPC ........... 180/65.1; 429/452; 429/453; 429/471
(58) Field of Classification Search
  USPC .......... 180/65.1, 65.21, 65.31, 68.5; 429/452, 429/471, 65, 121, 178
  See application file for complete search history.

(56) References Cited

U.S. PATENT DOCUMENTS

| 4,714,661 | A | 12/1987 | Kaun et al. |
| 5,147,216 | A | 9/1992 | Shotey .......................... 439/367 |
| 6,682,841 | B1 | 1/2004 | Armstrong et al. ............. 429/34 |
| 7,631,712 | B2 | 12/2009 | Watanabe |
| 8,302,712 | B2 * | 11/2012 | Aoto ........................... 180/65.1 |

(Continued)

FOREIGN PATENT DOCUMENTS

| DE | 43 40 007 A1 | 6/1994 |
| DE | 697 09 283 T2 | 8/2002 |

(Continued)

OTHER PUBLICATIONS

International Search Report mailed Apr. 17, 2008 of PCT/JP2008/050654.

(Continued)

*Primary Examiner* — Carlos Barcena
(74) *Attorney, Agent, or Firm* — Kenyon & Kenyon LLP

(57) ABSTRACT

A fuel cell module for a vehicle, which accommodates a stacked-cell body which is provided with electric output terminals for taking electric power from stacked power generating cells in a metallic casing which has an insulation layer on its inner surface, is disposed in a vehicle front room such that the stacked direction of the power generating cells is a longitudinal direction of the vehicle and the electric output terminals face the front of the vehicle. An insulating cover made of insulating rubber which is thicker than an insulation layer of a cover is disposed on the exterior surface of the electric output terminals to prevent short circuiting of the electric output terminals.

5 Claims, 10 Drawing Sheets

(56) References Cited

U.S. PATENT DOCUMENTS

| | | |
|---|---|---|
| 2001/0049056 A1 | 12/2001 | Saito et al. .................... 429/175 |
| 2002/0142209 A1 | 10/2002 | Kikuchi et al. ................. 429/34 |
| 2002/0187380 A1 | 12/2002 | Tanaka et al. ................... 429/34 |
| 2002/0187382 A1 | 12/2002 | Nishiumi et al. |
| 2003/0111971 A1 | 6/2003 | Ishikawa et al. |
| 2005/0170225 A1 | 8/2005 | Okazaki |
| 2006/0177722 A1 | 8/2006 | Inagaki |
| 2007/0003811 A1 | 1/2007 | Zerfass et al. ................. 429/35 |

FOREIGN PATENT DOCUMENTS

| | | |
|---|---|---|
| EP | 1 700 734 A1 | 9/2006 |
| JP | 5-074473 A | 3/1993 |
| JP | 2002-208314 A | 7/2002 |
| JP | 2002-358993 A | 12/2002 |
| JP | 2002-367652 A | 12/2002 |
| JP | 2004-047211 A | 2/2004 |
| JP | 2005-190727 A | 7/2005 |
| JP | 2005-317408 A | 11/2005 |
| JP | 3767423 B | 2/2006 |
| JP | 2006-172850 A | 6/2006 |
| JP | 2006-252916 A | 9/2006 |
| JP | 2006236792 A | 9/2006 |
| JP | 2006-302629 A | 11/2006 |
| WO | 98/29917 A1 | 7/1998 |
| WO | 2006/106288 A2 | 10/2006 |

OTHER PUBLICATIONS

Office Action issued Mar. 21, 2012 in DE 11 2008 000 190.1-22 and English translation thereof.

Office Action issued Jun. 5, 2012 in JP 2007-006859 and English translation thereof.

* cited by examiner

# US 8,556,007 B2

FUEL CELL MODULE FOR VEHICLES

This is a division of U.S. patent application Ser. No. 13/425,075 filed 20 Mar. 2012, which is a divisional application of U.S. patent application Ser. No. 12/523,009 filed 13 Jul. 2009, which is a 371 national phase application of PCT/JP2008/050654 filed 11 Jan. 2008, claiming priority to Japanese Patent Application No. JP 2007-006859 filed 16 Jan. 2007, the contents of which are incorporated herein by reference.

TECHNICAL FIELD

The present invention relates to a structure of a fuel cell module for vehicles.

BACKGROUND ART

In recent years, automobiles using fuel cells as a source of drive energy have attracted attention as one possible measure for addressing environmental problems. In conjunction with this, there has been a noticeable effort to develop technology for installing fuel cells in the front section of automobiles. For example, Japanese Patent No. 3767423 describes a fuel cell-powered automobile in which a fuel cell is installed in the front end of the vehicle, the power generating cells of the fuel cell are stacked in the width direction of the vehicle, and a circuit breaker and an electric output terminal for receiving electric power from the fuel cell are arranged on a side face of the vehicle. In the described configuration, the fuel cell is housed in a casing for protection.

Because the position of the electric output terminal for receiving electric power from the fuel cell moves due to heat expansion of the fuel cell, there has also been proposed a fuel cell output terminal housed in a bellows as described in Japanese Patent Publication JP-A 5-74473, and an output cable for receiving electric power from the fuel cell covered with an insulator as described in Japanese Patent Publication JP-A 2002-208314.

Meanwhile, technology for producing high voltage fuel cells having a large capacity has progressed, and high-performance vehicles in which such cells are installed are now being studied. However, as the voltage and capacity of fuel cells increase, there dimensions such as width and length become large, possibly to the extent that it may not be possible to stack the power generating cells in the width direction, in which case the fuel cell cannot be installed in the width direction of the vehicle. In such a case, it might become necessary to stack the power generating cells in the longitudinal direction of the vehicle and to install the fuel cell in the longitudinal direction of the vehicle.

In a case where the fuel cell is installed in the longitudinal direction within the front section of the vehicle, a fuel pipe and the like connecting to the fuel cell are arranged on the rear side in a fuel cell installing space of the vehicle in view of safety. In such a configuration, the electric output terminal from the power generating cells would likely be arranged on the front end of the power generating cells, in the vehicle front section, the side opposite to the connection ports of the fuel pipe and the like.

When the electric output terminal is arranged towards the front of the vehicle, the casing in which the fuel cell is housed may be deformed if the vehicle body adjacent to the fuel cell is deformed as a result of the vehicle colliding with an object. Although an insulation coating is applied to the inner surface of the casing for the fuel cell, the insulation coating can become broken because of the contact between the deformed casing and the electric output terminal, in which case the electric output terminal and the casing may become electrically connected, possibly resulting in a short circuiting of the electrical system.

When the fuel cell is installed on the vehicle front side as described above, the power generating cells are stacked along the longitudinal direction of the vehicle, and a side face of the stacked-cell body becomes a side face of the vehicle. With such a configuration, the side face of the casing in which the fuel cell is housed might become deformed due to the deformation of the vehicle side face in the event of a collision impacting the side of the vehicle. When the side face of the casing is deformed, the deformed casing comes into contact with the side face of the stacked-cell body, resulting in a possibility that a short circuit occurs between the individual stacked power generating cells through the metallic casing. Even when the inner surface of the metallic casing is insulation-coated, contact of the metallic casing with the power generating cells may still damage the insulation coating, with the result, again, that a short circuit as described above may occur.

If a short circuit occurs between the electric output terminal of the fuel cell and the vehicle or between the power generating cells, there were problems that an abnormal electric potential is generated in the power generating cells, for example, sintering of a catalyst, oxidation of supported carbon, or the like is generated, resulting in deterioration of the catalyst.

DISCLOSURE OF THE INVENTION

The present invention may be configured as a fuel cell module for a vehicle of the invention is a fuel cell module for a vehicle including a stacked-cell body which is provided with electric output terminals for taking electric power from stacked power generating cells, and a metallic casing which has an insulation layer on its inner surface and accommodates the stacked-cell body, wherein an insulator which is thicker than the insulation layer is disposed between the insulation layer and the electric output terminals.

The present invention further provides a fuel cell module for a vehicle of the invention is a fuel cell module for a vehicle, including a stacked-cell body which is provided with a positive electric output terminal having a voltage higher than a ground potential and a negative electric output terminal having a voltage lower than the ground potential, and a metallic casing which has an insulation layer on its inner surface, accommodates the stacked-cell body and has the same potential as the ground potential, wherein an insulator thicker than the insulation layer is disposed between the insulation layer and the individual electric output terminals.

In the fuel cell module for a vehicle of the invention, the stacked-cell body is preferably disposed at the front end of the vehicle, with the power generating cells stacked in the longitudinal direction of the vehicle and the electric output terminals located on the vehicle front side; the insulator is preferably made of insulating rubber or an insulating resin; the insulator is preferably an insulating cover for covering the electric output terminals; the insulator is preferably an insulating plate which is disposed on the inner surface of the casing; and the insulating plate is preferably fixed to a tightening member for the stacked-cell body.

The present invention may further be configured as a fuel cell module for a vehicle of the invention is a fuel cell module for a vehicle, including a stacked-cell body having power generating cells stacked, and a metallic casing for housing the stacked-cell body, wherein an insulator is disposed between the metallic casing and a surface of the stacked-cell body opposite a side face of the vehicle. In the fuel cell module for a vehicle of the invention, an insulator is preferably disposed between the metallic casing and individual surfaces, which are opposed to individual side faces of the vehicle, of the individual stacked-cell bodies which accommodate a plurality of the stacked power generating cell bodies and are disposed on both side faces of the vehicle; a thin insulating sheet thinner than the insulator is preferably disposed between a plurality of the stacked power generating cell bodies; the metallic casing has preferably an insulation layer on its inner surface, and the insulator is thicker than the insulation layer; and the insulating sheet is preferably thicker than the insulation layer.

Application of the present invention makes it possible to prevent short circuiting of the electric output terminals of the fuel cell module for a vehicle or between the power generating cells of the fuel cell module for the vehicle.

BEST MODE FOR CARRYING OUT THE INVENTION

Preferred embodiments of the invention will be described with reference to the figures.

Figure 1:
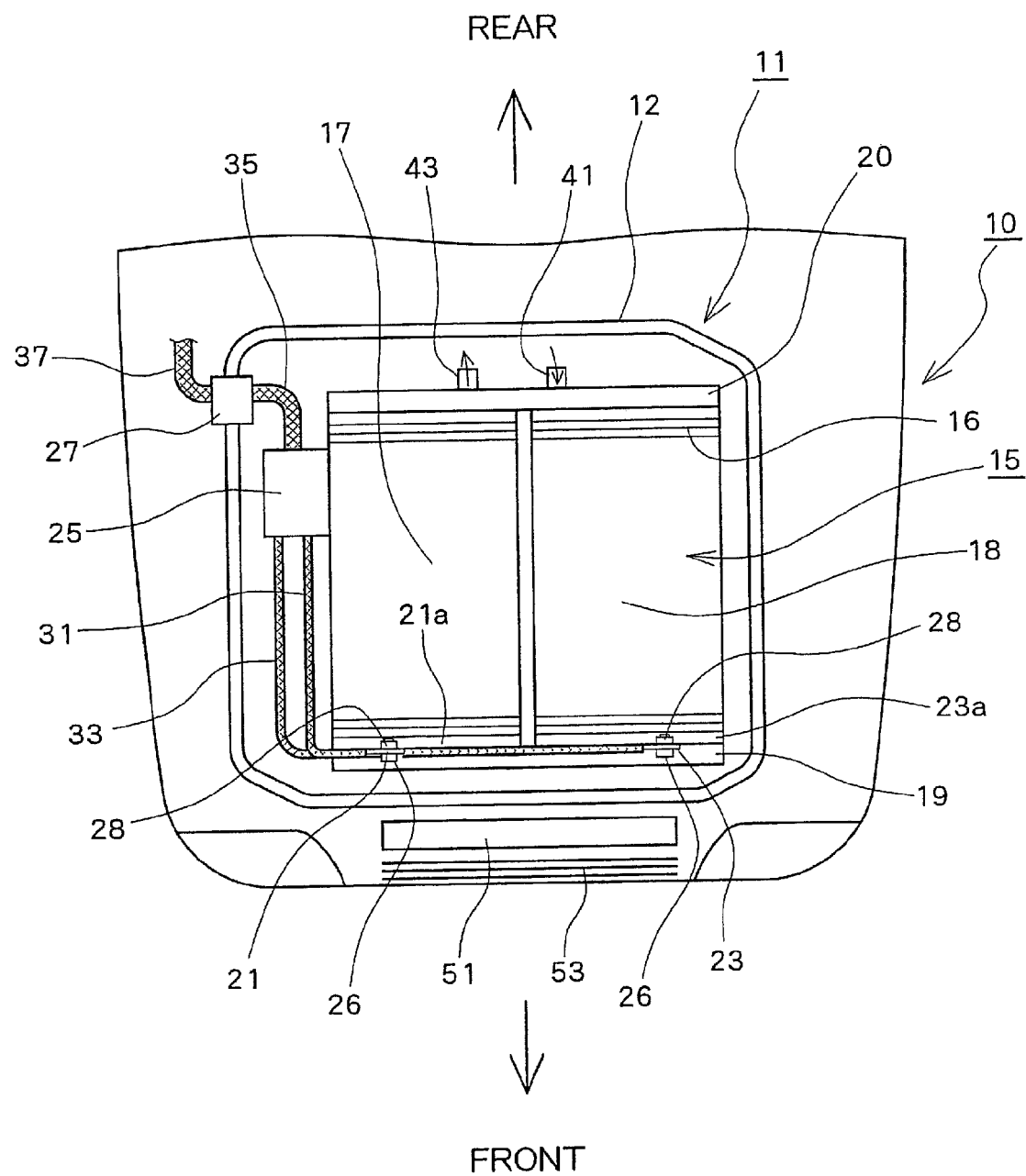
FIG. 1 is a schematic plan view showing a fuel cell module according to a first embodiment of the present invention installed in a vehicle.

FIG. 1 is a schematic plan view of the front section of an automobile (vehicle front section) in which is installed a fuel cell module according to the first embodiment of the present invention. In FIG. 1, a fuel cell module 11 is installed in a room 10 at the vehicle front section. The fuel cell module 11 has a casing 12 in which a stacked-cell body 15 is housed. The casing 12 has a casing body 12a and a cover 14 and houses the stacked-cell body 15 airtight. For the convenience of explanation, the cover 14 and insulating covers attached to individual electric output terminals 21, 23 are omitted from the figure so that the configuration of the stacked-cell body 15, cables, and the like contained are visible.

The stacked-cell body 15 has a first cell stack 17 and a second cell stack 18 which are stacked bodies of power generating cells 16 which are plate-like unit cells, electrode plates 21a, 23a which are stacked at one end of the individual cell stacks 17, 18, and end plates 19, 20 which are arranged on both sides of the individual electrode plates 21a, 23a. The individual cell stacks 17, 18 which are arranged in parallel are configured to include the same number of power generating cells 16 and to generate the same voltage. The stacked direction of each of the first cell stack 17 and the second cell stack 18 is a longitudinal direction of the vehicle, and the individual cell stacks 17, 18 and the individual electrode plates 21a, 23a are compressed in the stacked direction by the metallic end plates 19, 20 which are arranged at their front and rear ends and have a relatively large thickness (for example, a thickness of about 15 mm).

Figure 2:
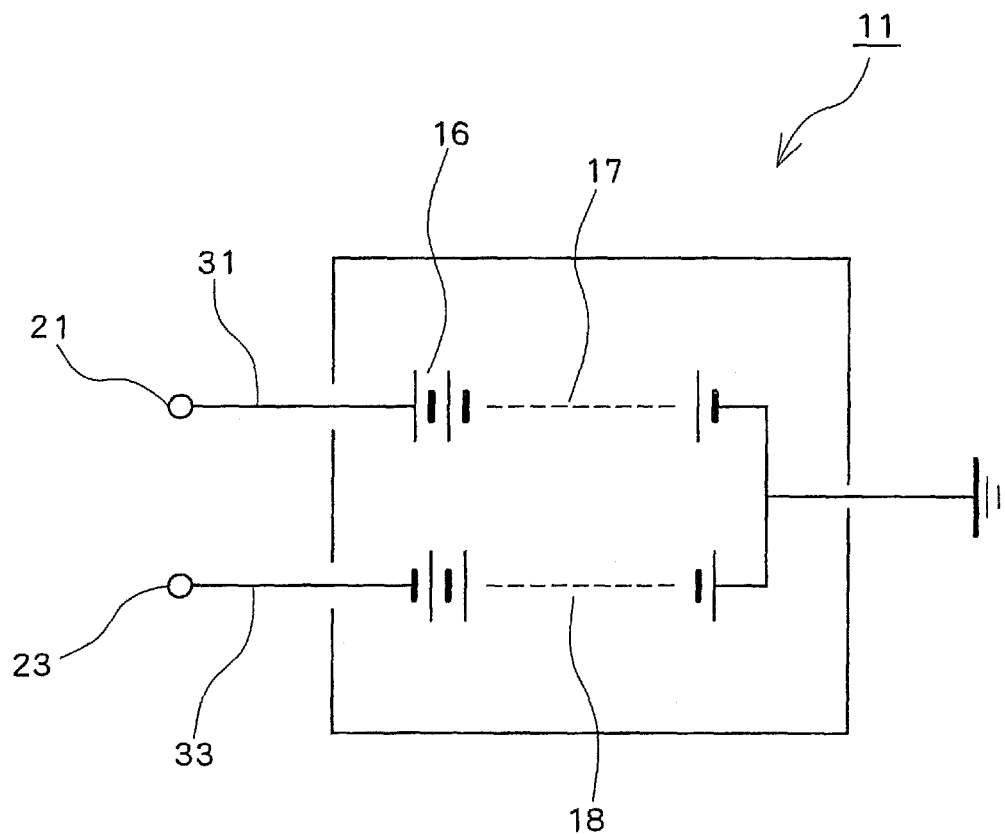
FIG. 2 is an explanatory view showing a connected state of power generating cells of the fuel cell module according to the first embodiment of the present invention.

As shown in FIG. 2, in the first cell stack 17 and the second cell stack 18 the power generating cells 16 are stacked with polarities directed to opposite directions from each other. The first cell stack 17 has positive terminals directed to the vehicle front and negative terminals directed to the vehicle rear shown in FIG. 1, and the second cell stack 18 has negative terminals directed to the vehicle front and positive terminals directed to the vehicle rear shown in FIG. 1. The ends of the first cell stack 17 and the second cell stack 18 on the side of the end plate 20 are electrically connected to each other. Thus, the cell stacks 17, 18 compose a series-connected unit cell body of one power generating cell 16 and provides a desired high voltage. The electrically connected ends on the side of the end plate 20 are also connected to the vehicle body, and their connection point is a ground electric potential.

Therefore, the electric output terminal 21 of the electrode plate 21a stacked at the end on the side of the end plate 19 of the first cell stack 17 and the second cell stack 18 becomes a positive electric output terminal having a voltage higher than the ground electric potential, and the electric output terminal 23 of the electrode plate 23a stacked on the second cell stack 18 becomes a negative electric output terminal having a voltage lower than the ground electric potential. The metallic casing 12 mounted in the vehicle body becomes the ground electric potential.

While the end plates 19, 20 are fixed to the casing 12, the dimensions of the cell stacks 17, 18 may change in the stacked direction due to thermal expansion, contraction, or the like resulting from temperature changes. Accordingly, stacked disc springs (not shown) are assembled between the end plate 19 and the electrode plate 21a and between the end plate 19 and the electrode plate 23a to configure such that the power generating cells 16 which are unit cells configuring the cell stacks 17, 18 are always press-contacted mutually by a proper force.

Within the casing 12 are sheathed cables 31, 33 for bringing electric power from the stacked-cell body 15, a relay 25 which cuts off a harness 35 and an electric circuit, the electric circuit, a distributor (not shown), and the like. The relay 25 and the electric output terminals 21, 23 which are a positive terminal and a negative terminal are electrically connected through the flexible sheathed cables 31, 33. The sheathed cables 31, 33 are fixed to the positive and negative electric output terminals 21, 23 and the terminals of the relay 25 by a bolt 26 and a nut 28.

A service plug 27 is attached to a position on the side and rear side face of the casing 12, while the relay 25 and the service plug 27 are electrically connected by the sheathed harness 35 for each positive and negative terminal. Additionally, a power output cable 37 is extended from the service plug 27 to the exterior of the casing 12, and the harness 35 and the power output cable 37 are electrically connected by the service plug 27.

With the configuration as described, electric power generated by the fuel cell module 11 is output from the power output cable 37 via the relay 25 and the service plug 27, and the output can be cut off by the relay 25 and the service plug 27. The relay 25 controls electrical flow between the terminals to which the sheathed cables 31, 33 are connected and the terminal connected to the harness 35 for the positive and negative terminals, according to an externally-supplied control signal. For example, the relay 25 is normally kept ON when the vehicle is traveling or the like, and it is possible to output from the fuel cell module 11. Meanwhile, the relay is switched OFF according to a control signal which is issued when a crash sensor (not shown) detects a collision or the like of the own vehicle, and the output from the fuel cell module 11 is cut off.

Meanwhile, the end plate 20 of the stacked-cell body 15 is provided with a fuel inlet pipe 41 and an exhaust gas discharge pipe 43. These pipes are arranged on the rear side under the vehicle front room 10 where the casing 12 is disposed.

Additional components for operating the vehicle, such as a radiator 51 or the like, are housed in the vehicle front room 10 in addition to the casing 12 in which the stacked-cell body 15 is housed, and front wheels 57 are fitted on both sides. The radiator 51 is disposed between the casing 12 and a front grill 53 at the front of the room 10, and configured to be connected to a coolant path circulating within the fuel cell module 11, in order to enable cooling of the liquid coolant circulating through the coolant path.

Figure 3:
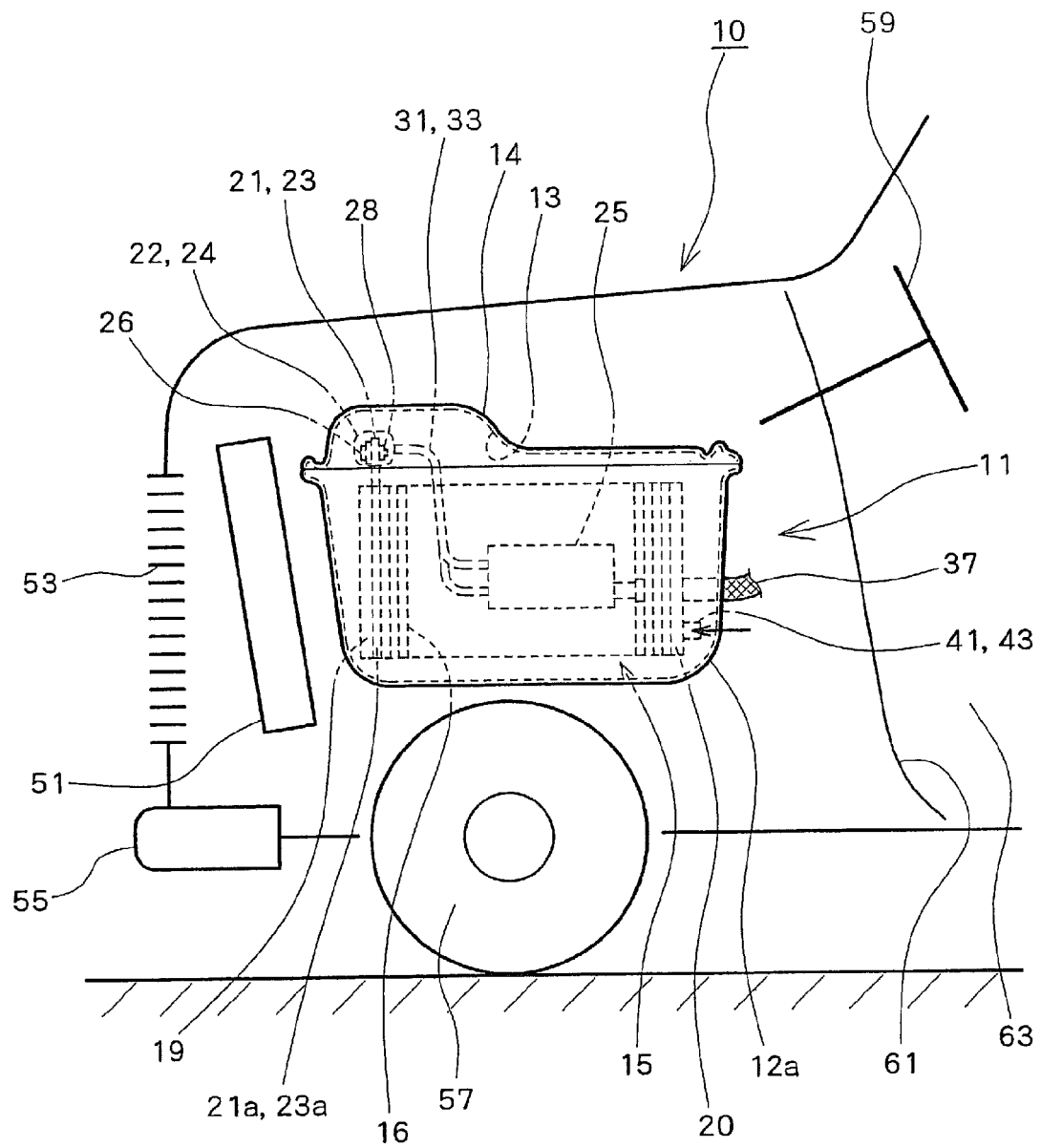
FIG. 3 is a schematic elevation view of a fuel cell module according to the first embodiment of the present invention mounted in a vehicle.

FIG. 3 is a schematic elevation view showing the fuel cell module 11 installed in the vehicle front room 10. As shown in FIG. 3, the vehicle front room 10 has a shape which protrudes beyond the vehicle front. Additionally, a vehicle interior 63 where a steering wheel 59 and the like are installed and the area in the room 10 are separated by a partition wall 61.

The fuel cell module 11 is installed near the center of the room 10 and fixed to the vehicle body such that the power generating cells 16 are stacked in the longitudinal direction of the vehicle. The stacked-cell body 15 is housed in the casing body 12a. The casing 12 is made airtight by fixing the cover 14 to the top of the casing body 12a. The casing body 12a and the cover 14 have an insulation layer 13 on their inner surfaces. The individual electrode plates 21a, 23a of the positive terminal and the negative terminal are stacked at the front of the stacked-cell body 15, and the individual electrode plates 21a, 23a are provided with the individual electric output terminals 21, 23 which are projections projecting toward the vehicle top. Further, the cover 14 is formed to have a bulged section in the area towards the front which covers the individual electric output terminals 21, 23, so as to provide a necessary clearance for these individual electric output terminals 21, 23.

Figure 4:
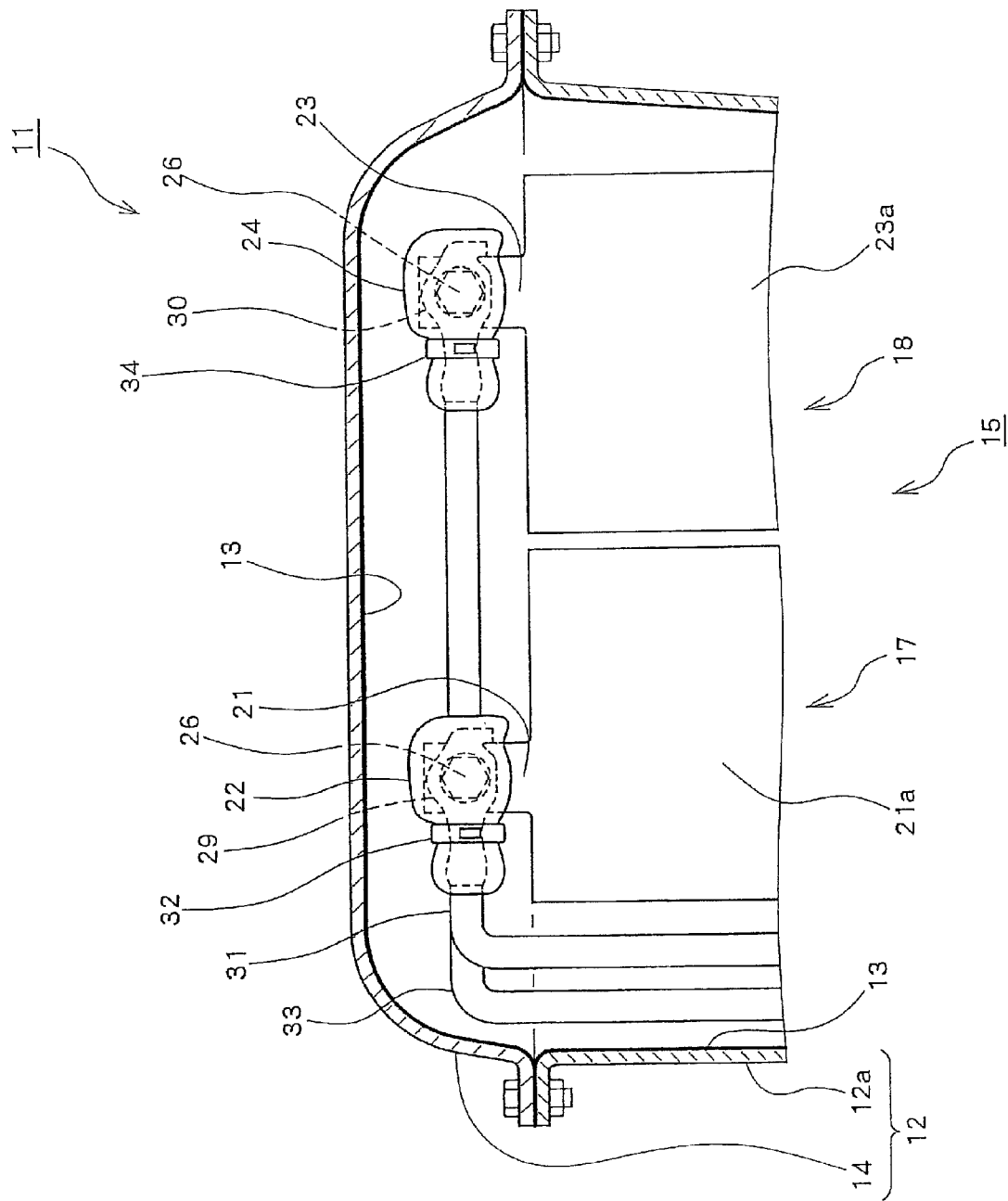
FIG. 4 is a partial sectional view of a fuel cell module including electric output terminals according to the first embodiment of the present invention.

As shown in FIG. 4, the individual electrode plates 21a, 23a of the positive terminal and the negative terminal are configured to be insulated from each other by a middle partition, and the individual electric output terminals 21, 23 of the positive terminal and the negative terminal are arranged to project. The cover 14 of the casing 12 bulges upward from the connected surface to provide a clearance for the individual electric output terminals 21, 23 as shown in the figure, and the insulation layer 13 is disposed on the inner surface. The insulation layer 13 may be provided using an insulation coating or the like. The individual electric output terminals 21, 23 are square plates formed of a conductive material such as copper or the like and have a hole formed in their center. Meanwhile, the sheathed cables 31, 33 which take electric power from the individual electric output terminals 21, 23 are flexible cables, and connecting terminals 29, 30 for connection with the individual electric output terminals 21, 23 are attached to one ends of the individual sheathed cables 31, 33. The connecting terminals are made of a metal plate having its leading end bent into an L shape and a hole for fixing the center. The bolt 26 is inserted through each of the holes formed in the centers of the individual electric output terminals 21, 23 and each of the holes formed in the connecting terminals 29, 30 and fixed by tightening the nut 28. Thus, the connecting terminals 29, 30 of the sheathed cables 31, 33 are attached and fixed to the individual electric output terminals 21, 23.

Figure 5A:
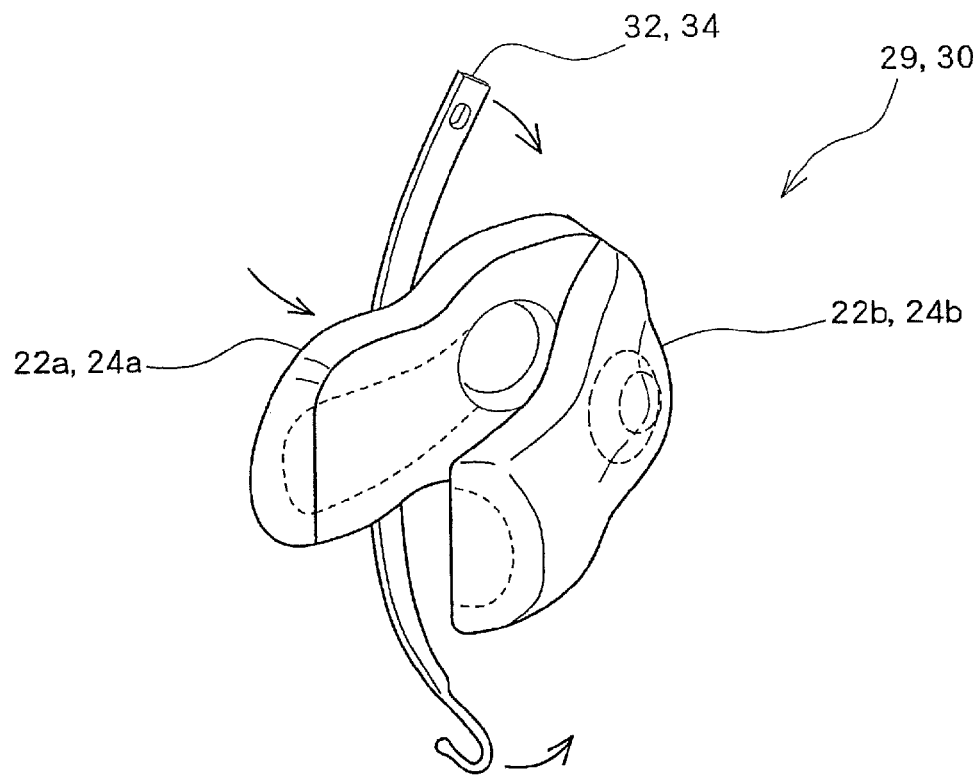
FIG. 5A is a perspective view of an insulating cover according to the first embodiment of the present invention in an open state.
Figure 5B:
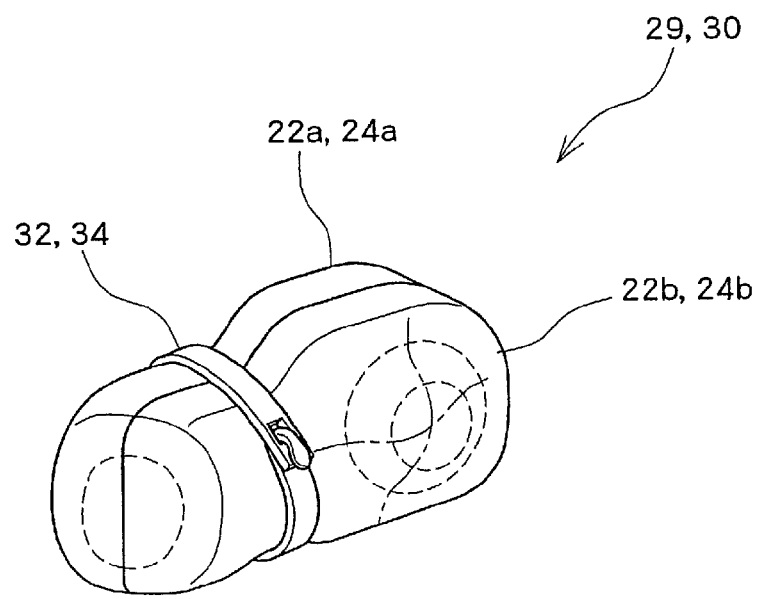
FIG. 5B is a perspective view showing an assembled state of an insulating cover according to the first embodiment of present the invention.

Insulating covers 22, 24 are attached as insulators to cover the external surfaces of the individual electric output terminals 21, 23 and the connecting terminals 29, 30 fixed to the individual electric output terminals 21, 23. The insulating covers 22, 24 are preferably formed of a material such as rubber having sufficient thermal conductivity. As shown in FIG. 5A, the individual insulating covers 22, 24 are configured of, for example, nut sides 22a, 24a and bolt sides 22b, 24b of the individual electric output terminals 21, 23. One end each of the insulating covers is integrally formed and the other end is openable, so that they are easily attached to the individual electric output terminals 21, 23. The insulating covers 22, 24 are configured to have inner surfaces with recessed portions to conform with the individual shapes of the electric output terminals 21, 23; the connecting terminals 29, 30; the bolt 26 and the nut 28 so as to cover these components, and the exterior surface externally protruded according to the recessed portions so the insulator will have a substantially uniform thickness. Tightening bands 32, 34 are attached on the side of an opening. The tightening bands 32, 34 have a hole in one end and a hook attached to the other end. As shown in FIG. 5B, after the insulating covers 22, 24 are attached to the individual electric output terminals 21, 23 and the connecting terminals 29, 30, the holes of the tightening bands 32, 34 are caught by the hooks to firmly fix the individual insulating covers 22, 24 to the individual electric output terminals 21, 23.

Figure 6A:
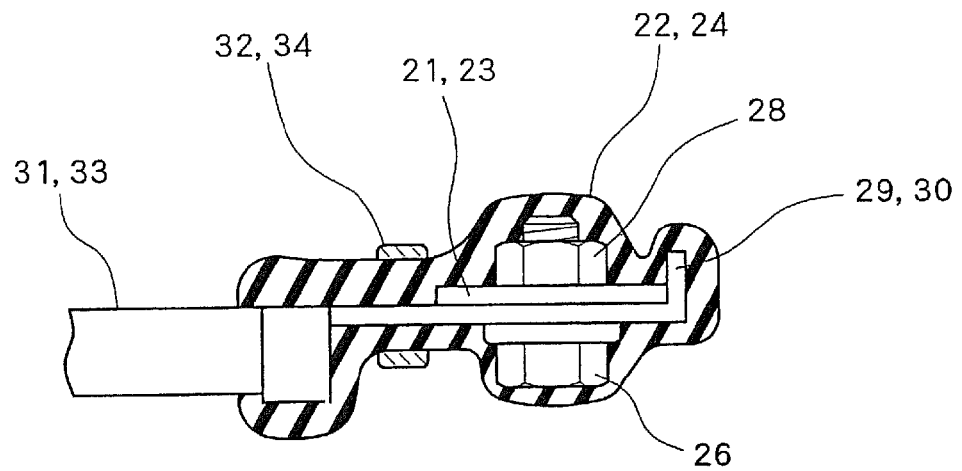
FIG. 6A is an explanatory view showing a section of the insulating cover attached to the electric output terminals of the fuel cell module according to the first embodiment of the present invention.
Figure 6B:
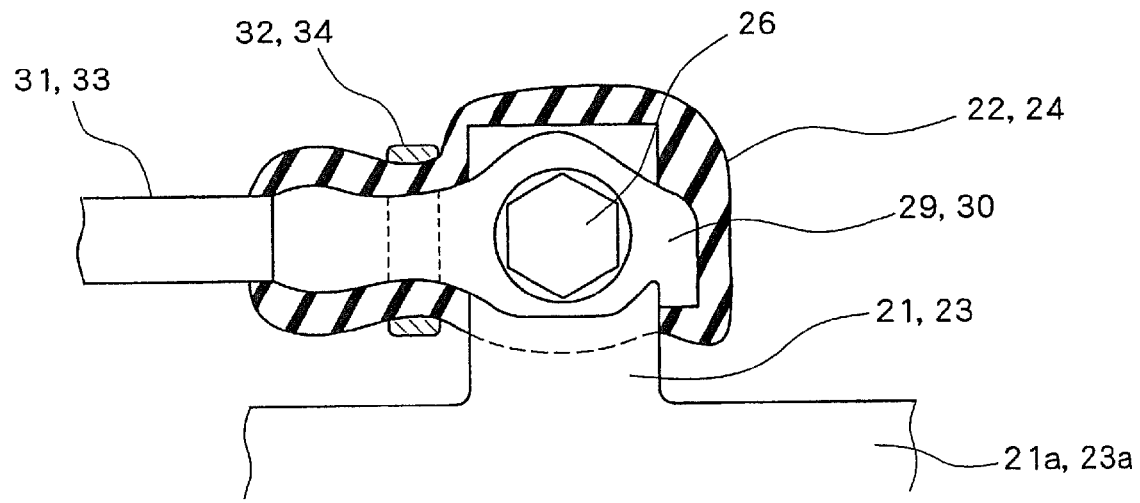
FIG. 6B is an explanatory view showing an insulating cover attached to the electric output terminals of the fuel cell module according to the first embodiment of the present invention.

FIG. 6A and FIG. 6B show sectional views of the insulating covers 22, 24 which are attached to the outside surfaces of the individual electric output terminals 21, 23 and the connecting terminals 29, 30. As shown in FIG. 6A, when the individual insulating covers 22, 24 are fixed to the individual electric output terminals 21, 23 by the pressure of the tightening bands 32, 34, the inner surfaces of the individual insulating covers 22, 24 are firmly attached to the individual surfaces of the individual electric output terminals 21, 23, the connecting terminals 29, 30, the bolt 26 and the nut 28 by virtue of the elasticity of the material rubber. Therefore, heat from the individual electric output terminals 21, 23 which are also heat generators is transmitted to the individual insulating covers 22, 24 and readily radiated from the outside surfaces. Thus, the individual electric output terminals 21, 23 can be prevented from having an increase in temperature. In addition, because the insulating covers 22, 24 have a substantially equal thickness with respect to the individual electric output terminals 21, 23 and the connecting terminals 29, 30, heat radiated from the individual surfaces is not dissipated, heat from the individual electric output terminals 21, 23 can be radiated evenly from the entire circumference, and temperature variations can be eliminated.

As shown in FIG. 6A and FIG. 6B, because the insulating covers 22, 24 have a thickness greater than that of other insulation coating or the like, when they receive an outside impact, they can absorb the impact and reduce an occurrence of a damage to the insulating covers 22, 24 by virtue of their thickness, so that the insulated states of the individual electric output terminals 21, 23 can be maintained.

Next, deformation of the room 10 and the fuel cell module 11 and the retention of the insulated states of the individual electric output terminals 21, 23 in the event that the front of a fuel cell vehicle installed with the fuel cell module 11 configured as described above comes into collision with another object will be described.

Figure 7:
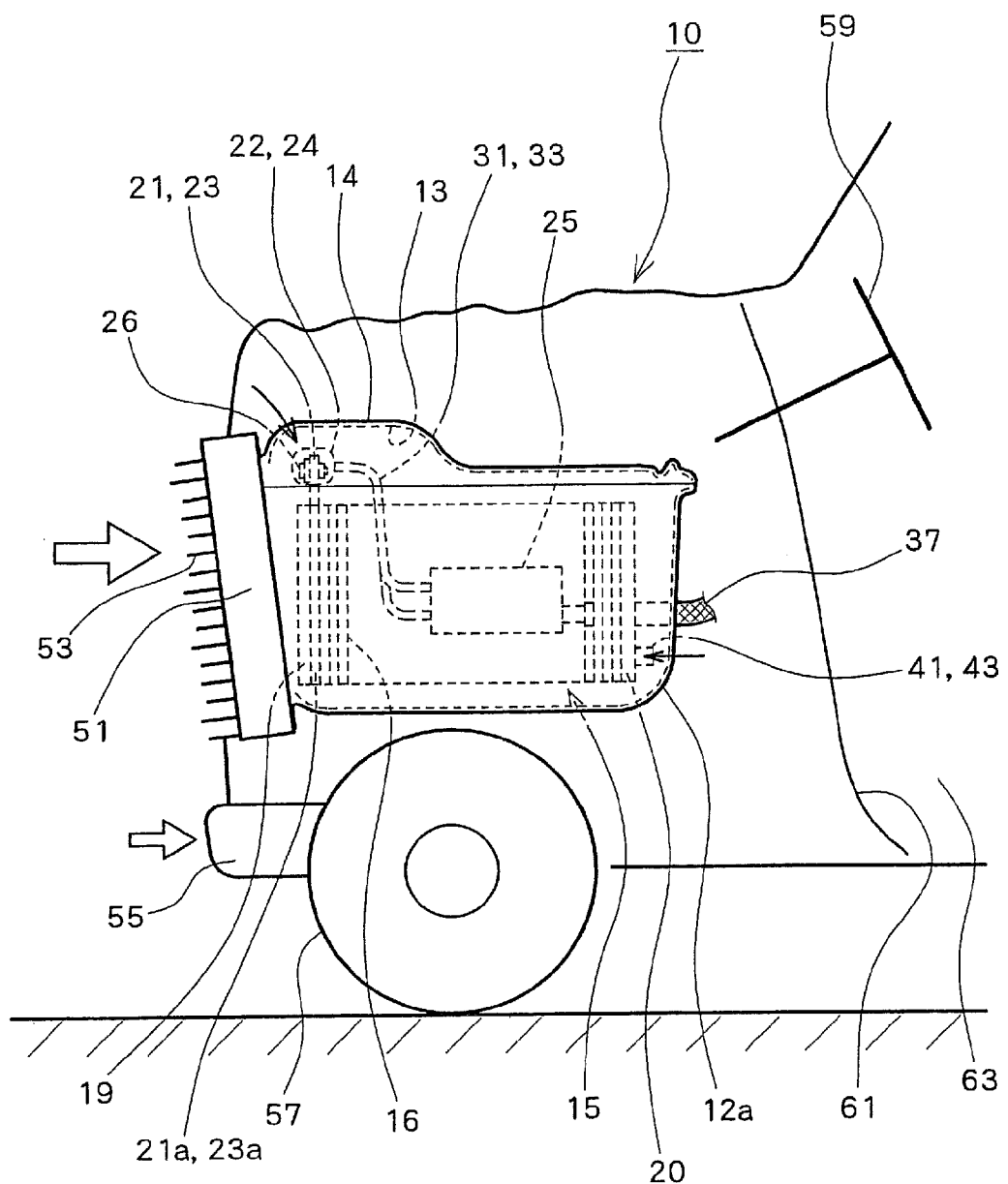
FIG. 7 is a schematic elevation view showing an example of deformation of a vehicle and a fuel cell module when the front of a vehicle on which a fuel cell according to present invention is involved in a collision with an object.

As shown in FIG. 7, when the front of the fuel cell vehicle collides with another object, a crash sensor (not shown) detects the collision and turns off the relay 25 to cut off the output from the fuel cell module 11. A bumper 55 which is mounted on the front of the vehicle is pushed toward the vehicle rear as a result of the front-end collision. In addition, the room 10 including the front grill 53 of the vehicle is shortened due to compression deformation and the radiator 51 between the front grill 53 and the fuel cell module 11 is displaced rearwards and pushed against the casing body 12a of the fuel cell module 11 and the cover 14. Because the casing body 12a and the cover 14 are formed of, for example, a metal such as an aluminum alloy or the like, their front parts are crushed by plastic deformation. At this time, the cover 14 is deformed to be compressed in the longitudinal direction of the vehicle and the swelled portion on the top of the cover 14 is also deformed downward, towards the individual electric output terminals 21, 23. Thus, the deformation causes the inner surface of the cover 14 to come into contact with the insulating covers 22, 24 which are attached to the exteriors of the individual electric output terminals 21, 23. As described above, the electric output terminal 21 is a positive electric output terminal having a voltage higher than ground electric potential, and the electric output terminal 23 is a negative electric output terminal having a voltage lower than the ground electric potential. Because the cover 14 and the casing body 12a are made of metal and provide ground potential, such deformation will likely cause damage to the insulation between the metallic cover 14 and one or both of the metallic electric output terminals 21, 23, such that the cover 14 will come into direct contact with one or both the electric output terminals 21, 23, in which event a short circuit will result due to the voltage difference between the ground electric potential and the positive voltage or between the ground electric potential and the negative voltage. Even if the electric output of the fuel cell module 11 is cut off by the relay 25, the individual electrode plates 21a, 23a of the fuel cell module 11 are in states of high positive voltage and negative voltage, so that, when a short circuit as described above occurs, an abnormal electric potential is generated in the power generating cells 16, and a catalyst is deteriorated by, for example, sintering of the catalyst, oxidation of supported carbon, or the like. In addition, if the insulation between both the electric output terminals 21, 23 and the cover 14 which is a conductor is damaged, a short circuit may result between the electric output terminals 21, 23 through the cover 14. Because the resulting voltage difference is twice that of the difference between the cover 14 and one of the electric output terminals 21, 23, and the result damage to the catalyst is significantly greater.

However, because in the present embodiment the individual electric output terminals 21, 23 o have thick rubber insulating covers 22, 24, contact of the cover 14 to the exterior surfaces of the individual electric output terminals 21, 23 is far less likely to damage the insulation layer 13 which is formed of a soft insulation coating, and the metallic cover 14 and the individual electric output terminals 21, 23 are therefore unlikely to contact each other. Therefore, short circuiting between the cover 14 and the individual electric output terminals 21, 23 or between the electric output terminals 21 and 23 can be effectively prevented, so that an advantage is achieved in that the deterioration of the catalyst as a result of abnormal electric potentials in the power generating cells 16, for example, sintering of the catalyst, oxidation of supported carbon, or the like, can be prevented.

Even when the insulation layer 13 on the inner surface of the cover 14 is formed of an insulation coating or the like and cannot respond to a large plastic deformation of the metallic cover 14 and the coated surface is separated from the metallic surface to expose the metallic surface toward the inner surface of the cover 14, an advantage is still achieved in that the insulating covers 22, 24 attached to the individual electric output terminals 21, 23 are able to maintain an insulated state to effectively prevent the electric output terminals from short circuiting.

Figure 8:
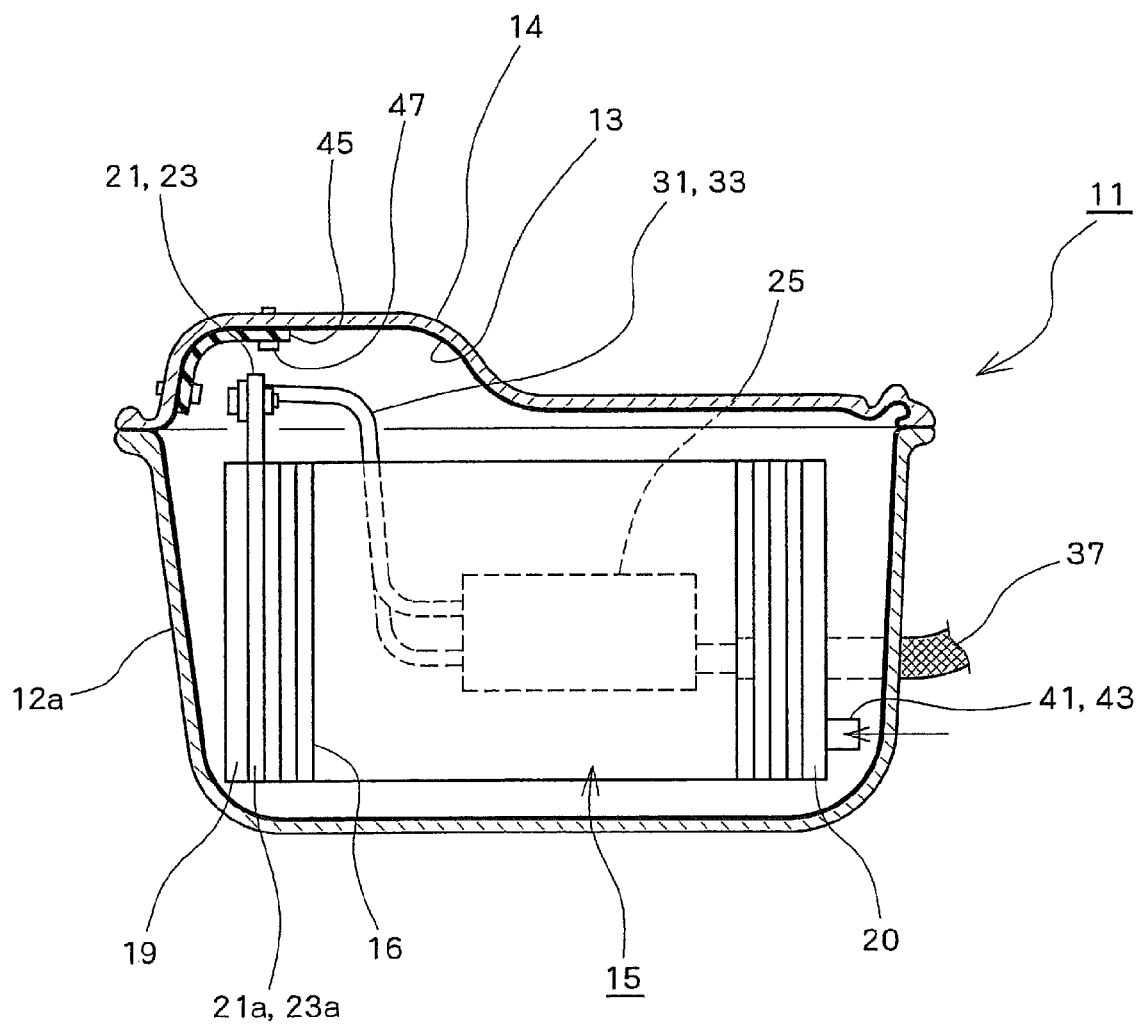
FIG. 8 is a schematic sectional view of a fuel cell module according to another embodiment of the invention.

A second embodiment will next be described with reference to FIG. 8. Corresponding components which function in the same manner as those of the previous embodiment are denoted by the same reference numerals as those used in the previous embodiment, and their detailed descriptions will not be repeated. The fuel cell module 11 of this embodiment has a resin insulating plate 45 attached to the inner surface of the cover 14 of the casing 12, which houses the stacked-cell body 15, with resin insulating bolts 47. It is sufficient that the insulating plate 45 be assembled between the electric output terminals 21, 23 and the insulation layer 13 on the inner surface of the cover 14, and its width may be configured to be equal to the total width of the fuel cell module 11 or equal to just the electric output terminal portion. And, as the resin insulating bolts 47 for attachment, it is configured to enable to prevent a short circuit between the cover 14 and the electric output terminals 21, 23 or between the electric output terminals 21 and 23 via the cover 14, even if the insulating bolts 47 come into contact with the electric output terminals 21, 23.

The resin insulating plate 45 has a thickness greater than that of the insulation layer 13 which is disposed on the inner surface of the cover 14, and is configured to prevent, by virtue of its thickness, short circuiting between the individual electric output terminals 21, 23 and the metallic portions of the cover 14, even in the even of a collision deforming the bulge in the cover 14.

Figure 9:
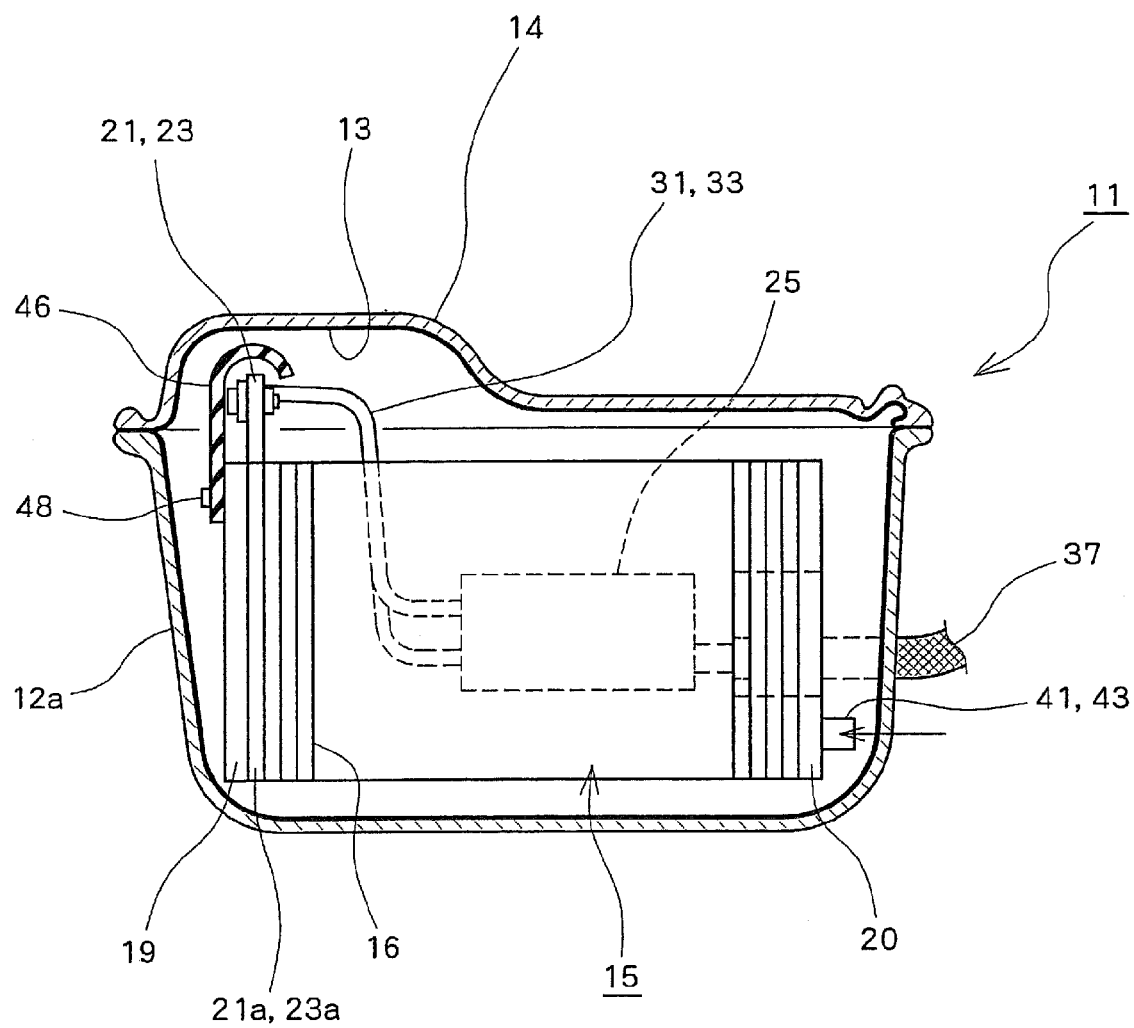
FIG. 9 is a schematic showing a sectional view of a fuel cell module according to still another embodiment of the invention.

Referring to FIG. 9, another embodiment will be described. Corresponding components which function in the same manner as those of either of the previous embodiments are denoted by the same reference numerals as those used in the previous embodiment, and their detailed descriptions will not be repeated. In this embodiment, a resin insulating plate 46 is assembled to a tightening member for tightening the end plate 19 of the stacked-cell body 15 housed in the casing 12 or the power generating cells 16, such as a tension plate, which is not shown. In this embodiment, the insulating plate 46 is fixed to the end plate 19 with the insulating bolts 48. The insulating plate 46 is assembled between the electric output terminals 21, 23 and the insulation layer 13 formed on the inner surface of the cover 14, and formed to be thicker than the insulation layer 13 so that, even if the bulge of the cover 14 is deformed towards the electric output terminals 21, 23 as a result of a collision or the like, the metallic portion of the cover 14 will not come into contact with the electric output terminals 21, 23, and a short circuit will not occur. The insulating plate 46 may be configured to be attached to the entire face in the width direction of the fuel cell module 11, or to just the electric output terminals 21, 23. Similar as in the previous embodiments, this embodiment also produces an advantageous effect that short circuiting between the cover 14 and the individual electric output terminals 21, 23 and between the electric output terminals 21 and 23 can be effectively prevented.

Although in the examples described with reference to FIG. 8 and FIG. 9, insulating covers 22, 24 are not provided for the individual electric output terminals 21, 23, it is also preferable that the insulating covers 22, 24 are attached in addition to the resin insulating plates 45, 46 similar to the embodiment shown in FIG. 1 to FIG. 6.

Figure 10:
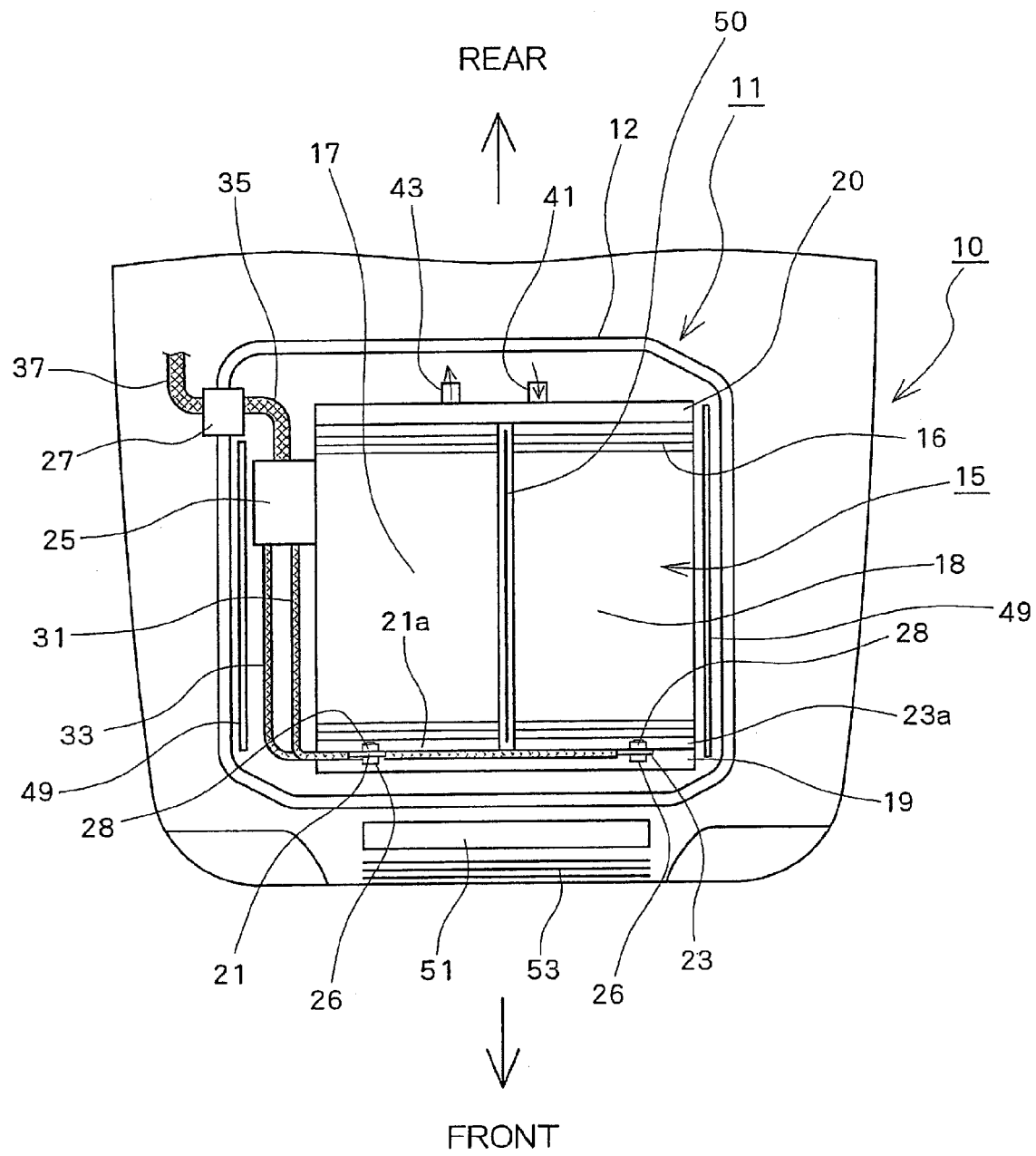
FIG. 10 is a schematic plan view showing a vehicle-mounted fuel cell module according to still another embodiment of the invention.

Referring to FIG. 10, a still further embodiment will be described below. Corresponding components which function in the same manner as those of the previous embodiments are denoted by the same reference numerals as those used in the previous embodiment, and their detailed descriptions will not be repeated. In this embodiment, the first and second cell stacks 17, 18 configuring the stacked-cell body 15 are housed in the casing 12 of the fuel cell module 11. As shown in FIG. 10, an insulating plate 49 is disposed between the casing 12 and a left side face of the cell stack 17, which faces towards one side of the vehicle. Also as shown in FIG. 10, another insulating plate 49 is also disposed between the casing 12 and a right side face of the cell stack 18, which faces towards another side of the vehicle, and an insulating sheet 50 is disposed between the first and second cell stacks 17 and 18. The insulating plate 49 may be formed of a rubber plate or a resin plate. The insulating sheet may be formed of a rubber plate or a resin plate which is thinner than the insulating plate 49. The insulating plate 49 and the insulating sheet 50 may be attached to the casing 12 with insulating bolts or the like or may be configured to attach to the individual cell stacks 17, 18.

The present invention may be configured such that the insulation layer is provided by insulation coating on the inner surface of the casing 12, or such that the insulating plate 49 is thicker than the insulation layer.

By employing a configuration as described above, there is produced an effect that, in the event of a side collision, occurrence short circuiting between the power generating cells via the casing due to the deformation of the casing can be effectively prevented. Further, by providing a thick insulator on the side face which is easily deformed to enhance the insulating property of the side face, there is produced an effect that the insulator can be reduced.

The invention claimed is:

1. A vehicle comprising:
at least one stacked-cell body having electric output terminals for taking electric power from stacked power generating cells; and
a metallic casing for housing the stacked-cell body, wherein:
the at least one stacked cell body is disposed in a vehicle front room together with the metallic casing such that the power generating cells are stacked in the longitudinal direction of the vehicle, and the electric output terminals are oriented facing towards the front of the vehicle, and
an insulator is provided between the metallic casing and a surface of the stacked-cell body facing a side surface of the vehicle to prevent a short circuit from occurring between the power generating cells through the metallic casing.

2. The vehicle according to claim 1, wherein a thin insulating sheet thinner than the insulator is disposed between a plurality of the stacked power generating cell bodies.

3. The vehicle according to claim 2, wherein the metallic casing has an insulation layer on its inner surface, the insulator is thicker than the insulator layer, and the insulating sheet is thicker than the insulation layer.

4. The vehicle according to claim 2, wherein the metallic casing has an insulation layer on its inner surface, and the insulator is thicker than the insulation layer.

5. The vehicle according to claim 1, wherein the metallic casing has an insulation layer on its inner surface, and the insulator is thicker than the insulation layer.

* * * * *